US009083701B2

(12) United States Patent
Hwang et al.

(10) Patent No.: US 9,083,701 B2
(45) Date of Patent: Jul. 14, 2015

(54) METHOD FOR PROVIDING ACTIVE SECURITY AUTHENTICATION, AND TERMINAL AND SYSTEM SUPPORTING SAME

(75) Inventors: Young Man Hwang, Goyang-si (KR); Kyoung Sook Yang, Suwon-si (KR)

(73) Assignee: Young Man Hwang, Goyang-si, Gyeonggi-do (KR)

( * ) Notice: Subject to any disclaimer, the term of this patent is extended or adjusted under 35 U.S.C. 154(b) by 252 days.

(21) Appl. No.: 13/695,547

(22) PCT Filed: Nov. 8, 2011

(86) PCT No.: PCT/KR2011/008451
§ 371 (c)(1),
(2), (4) Date: Oct. 31, 2012

(87) PCT Pub. No.: WO2012/067371
PCT Pub. Date: May 24, 2012

(65) Prior Publication Data
US 2013/0047238 A1    Feb. 21, 2013

(30) Foreign Application Priority Data
Nov. 19, 2010  (KR) .................. 10-2010-0115790

(51) Int. Cl.
*H04L 29/06*    (2006.01)
*H04L 9/32*     (2006.01)
*H04W 12/06*    (2009.01)
*G06F 7/04*     (2006.01)
*G06F 15/16*    (2006.01)
*G06F 17/30*    (2006.01)

(52) U.S. Cl.
CPC .......... *H04L 63/0838* (2013.01); *H04L 9/3228* (2013.01); *H04W 12/06* (2013.01); *H04L 2209/60* (2013.01)

(58) Field of Classification Search
None
See application file for complete search history.

(56) References Cited

U.S. PATENT DOCUMENTS

| 8,336,086 B2 * | 12/2012 | Seo .................................. 726/5 |
| 2003/0210127 A1 * | 11/2003 | Anderson ..................... 340/5.27 |
| 2005/0254650 A1 * | 11/2005 | Sakurai et al. ............... 380/268 |
| 2006/0206919 A1 * | 9/2006 | Montgomery et al. .......... 726/2 |
| 2008/0018927 A1 * | 1/2008 | Martin et al. ................ 358/1.15 |
| 2008/0184036 A1 * | 7/2008 | Kavsan ........................ 713/184 |
| 2010/0109920 A1 * | 5/2010 | Spradling ....................... 341/23 |
| 2010/0185871 A1 * | 7/2010 | Scherrer et al. ............... 713/186 |
| 2010/0325046 A1 * | 12/2010 | Milne ............................. 705/44 |
| 2012/0042364 A1 * | 2/2012 | Hebert ............................ 726/6 |
| 2012/0060030 A1 * | 3/2012 | Lamb ........................... 713/166 |

* cited by examiner

*Primary Examiner* — Shin-Hon Chen
(74) *Attorney, Agent, or Firm* — Sherr & Jiang, PLLC

(57) ABSTRACT

Disclosed herein are a method for providing active security authentication, and a terminal and system for supporting the same. The terminal includes a storage unit, a display unit, an input unit and a control unit. The control unit arranges a plurality of keys through an arrangement of random numbers when a security execution condition is satisfied, outputs, to the display unit, a security authentication screen based on a random-number matrix in which at least some keys in key regions adjacent to an item key among the plurality of keys arranged by the arrangement of the random numbers are set to exception keys that a user must not press, and decide that the terminal is used for an illegal use when the exception keys are included in an input information generated through the input unit.

18 Claims, 8 Drawing Sheets

METHOD FOR PROVIDING ACTIVE SECURITY AUTHENTICATION, AND TERMINAL AND SYSTEM SUPPORTING SAME

CROSS REFERENCE TO PRIOR APPLICATIONS

This application is a National Stage Patent Application of PCT International Patent Application No. PCT/KR2011/008451 (filed on Nov. 8, 2011) under 35 U.S.C. §371, which claims priority to Korean Patent Application No. 10-2010-0115790 (filed on Nov. 19, 2010) which are all hereby incorporated by reference in their entirety.

TECHNICAL FIELD

The present invention relates to a security authentication technology, and more particularly, to a method for providing active security authentication, and a terminal and system for supporting the same, which enables security setting or disabling of the terminal to be more reliably performed.

BACKGROUND ART

In a security system, authentication is a method for distinguishing legal users from illegal users, and can be traditionally divided into three methods. The first authentication method is an identification (ID) and password input authentication method based on 'What do you know?' The second authentication method is a one-time password (OTP) and ID card input authentication method based on 'What do you have?' The third authentication method is a biometric authentication method based on 'Who are you?'

A basic authentication method of confirming an ID for distinguishing a user and a password for authenticating the user in the authentication method based on 'What do you know?' is most widely used due to its cheap expense and simple application as compared with other authentication methods. The basic authentication method has been settled and used on the basis of all security authentication systems for a long period of time.

However, in the existing basic authentication method, since a user always uses the same ID and password, the ID and password are easily exposed to a peripheral person by accident as the number of times of using digital devices in public places is frequent in recent years. Further, the ID and password becomes a final target to be attacked by hackers who maliciously wiretap contents on wire/wireless communication, which results in many security problems and accidents. Furthermore, since a high-priced security system such as an OTP or biometric authentication is additionally used to solve such security problems and accidents, users are additionally burdened with not a little cost.

DETAILED DESCRIPTION OF INVENTION

Technical Problems

In such a background, it is required to develop a security authentication system which enables a user to use advantages of the existing basic authentication method as they are and to generate and use a one-time password without the help of an OTP device, thereby efficiently detecting illegal users and preventing illegal uses.

It is thus an object of the present invention to provide a method for providing active security authentication, and a terminal and system for supporting the same, which can more reliably support security authentication of the terminal.

It is another object of the present invention to provide a method for providing active security authentication, and a terminal and system for supporting the same, which can dynamically change a process of identifying a fixed password used to identify the identity of a legal user whenever the process is used according to the user's selection.

It is still another object of the present invention to provide a method for providing active security authentication, and a terminal and system for supporting the same, which can prevent, in advance, a security accident due to the external exposure and illegal use of a security password by using an integrated system for detecting an illegal user through an abnormal behavior or event that occurs in a security authentication process and preventing an illegal use.

Technical Solutions

To solve the objective, the present invention provides a system for providing active security authentication, the system including: a terminal configured to output a security authentication screen based on a random-number matrix in which a plurality of keys are arranged through an arrangement of random numbers, generate input information including at least one of the plurality of keys, provide the generated input information to a content server, and obtain security authentication according to the input information from the content server; and a content server configured to receive and register, from the terminal, at least one item key for detecting an illegal attempt to disable security among the plurality of the keys and security setting information for security authentication, arrange the plurality of keys through an arrangement of random numbers when a security execution condition is satisfied as a corresponding terminal accesses the content server, provide the terminal with a security authentication screen based on a random-number matrix in which at least some keys in key regions adjacent to an item key among the plurality of keys arranged by the arrangement of the random numbers are set to exception keys that a user must not press, decide whether the terminal is used for security authentication or illegal use according to the input information received from the terminal, and decide that the terminal has been used for the illegal use when the exception keys are included in the input information.

When at least one exception key is included in the keys included in the registered security setting information, the content server may perform security authentication using the security setting information except the exception key included in the security setting information. When the exception key is not included in the input information, the content server may output security disable information to be substantially applied by excluding, from the security setting information, exception keys determined according to the placement of the item key on the currently output security authentication screen, and decide that the terminal is used for the illegal use according to whether or not the input information corresponds to the security disable information.

The content server may perform a security process according to when the item key is included in the input information, when the exception key is included in the input information or when the input information does not correspond to the security disable information. The content server may perform a security process of providing a chance to re-input new input information as many as a predetermined number of times, a security process of informing a specific security management server of the illegal use of the terminal, a security process of deleting at least a portion of information stored in the terminal for performing security authentication, a security process of providing the terminal with a message or alarm for the illegal use, a security process of restricting an access of the terminal to a server, or a security process of tracking the location of the terminal based on location information or IP information of the terminal.

The content server may identify whether or not the input information is an input signal for removing the item key, control the item key not to be applied to the security authentication screen when the input information is the input signal for removing the item key, and decide that the terminal is used for the illegal use according to whether or not subsequent additional input information corresponds to the security setting information to which the item key is not applied.

To solve the objective, the present invention provides a terminal for supporting active security authentication, the terminal including: a storage unit configured to store at least one item key for detecting an illegal attempt to disable security among a plurality of keys, an item application method in which at least some keys in key regions adjacent to the item key among the plurality of keys are set to exception keys that a user must not press, and security setting information for security authentication; a display unit configured to output a security authentication screen based on a random-number matrix in which the plurality of keys are arranged through an arrangement of random numbers; an input unit configured to generate input information including at least one of the plurality of keys; and a control unit configured to arrange the plurality of keys through an arrangement of random numbers when a security execution condition is satisfied, output, to the display unit, a security authentication screen based on a random-number matrix in which at least some keys in key regions adjacent to an item key among the plurality of keys arranged by the arrangement of the random numbers are set to exception keys that a user must not press, and decide that the terminal is used for an illegal use when the exception keys are included in the input information generated through the input unit. When at least one exception key is included in the keys included in the stored security setting information, the control unit may perform security authentication using the security setting information except the exception key included in the security setting information.

When deciding that the terminal has been used for the illegal use, the control unit may perform at least one of a security process of providing a chance to re-input new input information as many as a predetermined number of times according to when the item key is included in the input information, when the exception key is included in the input information or when the input information does not correspond to the security disable information, a security process of informing a specific security management server of the illegal use of the terminal, a security process of deleting at least a portion of information stored in the storage unit for performing security authentication, a security process of providing the terminal with a message or alarm for the illegal use and a security process of restricting an access of the terminal to a server. The security authentication screen may be a key map screen provided with a matrix structure in which numbers, characters, special characters, images or icons are arranged in a certain matrix form.

The control unit may identify whether or not the input information is an input signal for removing the item key, control the item key not to be applied to the security authentication screen when the input information is the input signal for removing the item key, compare whether or not input information additionally input after the item key is removed corresponds to the security setting information to which the item key is not applied, perform security authentication when the input information corresponds to the security setting information, and decide that the terminal is used for the illegal use when the input information does not correspond to the security setting information.

To solve the objective, the present invention provides a method for providing active security authentication, the method including: registering at least one item key for detecting an illegal attempt to disable security among the plurality of the keys and security setting information for security authentication; arranging the plurality of keys through an arrangement of random numbers when a security execution condition is satisfied, and outputting a security authentication screen based on a random-number matrix in which at least some keys in key regions adjacent to an item key among the plurality of keys arranged by the arrangement of the random numbers are set to exception keys that a user must not press; receiving input information including at least one of the plurality of keys; identifying whether or not the exception keys are included in the input information; and deciding that a terminal is used for an illegal use when the exception keys are included in the input information.

The registering may further include setting an item application method in which at least some keys in key regions adjacent to the item key to exception keys that the user must not press, and the identifying may further include identifying whether or not an additionally defined exception key is included in the input information according to the setting of the item application method.

The method may further include outputting security disable information to be substantially applied by excluding, from the security setting information, exception keys determined according to the placement of the item key on the currently output security authentication screen; identifying whether or not the input information corresponds to the security disable information; and deciding that the terminal is used for the illegal use when the input information corresponds to the security disable information.

The method may further include performing a security process according to the decision that the terminal has been used for the illegal use. The performing of the security process includes performing a security process according to when the item key is included in the input information, when the exception key is included in the input information or when the input information does not correspond to the security disable information.

The method may further include identifying whether or not the input information is an input signal for removing the item key; and controlling the item key not to be applied to the security authentication screen when the input information is the input signal for removing the item key. The method may further include comparing whether or not input information additionally input after the item key is removed corresponds to the security setting information to which the item key is not applied, performing security authentication when the input information corresponds to the security setting information, and deciding that the terminal is used for the illegal use when the input information does not correspond to the security setting information.

The method may further include performing a security process according to the decision that the terminal has been used for the illegal use. The performing of the security process may include at least one of providing a chance to re-input new input information as many as a predetermined number of times; informing a specific security management server of the illegal use of the terminal; deleting at least a portion of information stored in the terminal for performing security authentication; outputting a message or alarm for the illegal use; and restricting an access of the terminal to a server.

Advantageous Effects

Based on the above structure, in the method for providing active security authentication, and the terminal and system for supporting the same according to the present invention, as a password input by a user is changed whenever the user inputs the password, it is possible to prevent, in advance, the occurrence of damage due to the password exposed by a neighboring person or malicious hacker.

Further, it is possible to achieve a strong security effect without operating an existing high-priced one-time OTP generator as a separate device or installing a separate program to the terminal.

Further, it is possible to detect an illegal use of the terminal in advance and take an active countermeasure by operating not only a password for simply identifying the identity of a user but also an item for detecting an illegal user.

Further, since the present invention is applicable to operating systems of all terminals using the conventional method of identifying a fixed password only by installing a program without installing separate hardware, it is possible to reduce installation cost and to perform a simple operation.

BEST MODES FOR PRACTICING INVENTION

Figure 1:
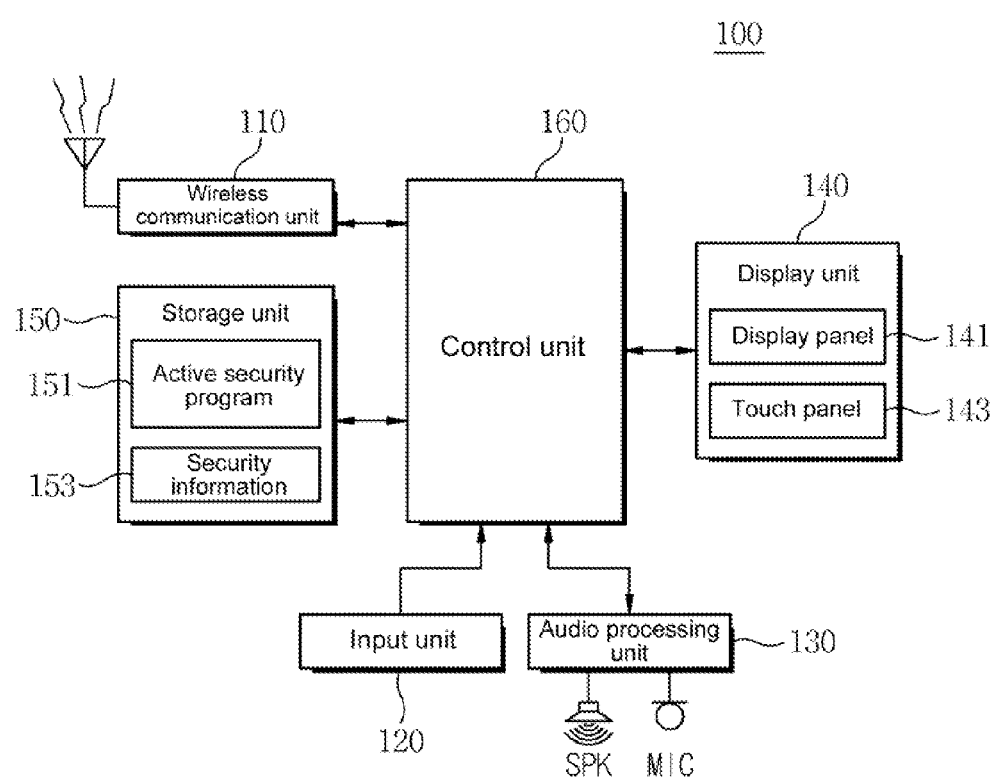
FIG. 1 is a block diagram schematically illustrating a configuration of a terminal according to an embodiment of the present invention.

The present invention now will be described more fully hereinafter with reference to the accompanying drawings, in which embodiments of the invention are shown. This invention should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Terms or words used in this specification and the claims should not be limitedly interpreted as having common or dictionary meanings, but should be interpreted as having meanings adapted to the technical spirit of the present invention on the basis of a principle that the inventor can appropriately define the concepts of the terms in order to describe his invention in the best way. Thus, the embodiments described in this specification and constructions shown in the drawings illustrate only the most preferred embodiments of the present invention and do not represent the entire technical spirit of the present invention. Accordingly, it should be understood that a variety of equivalent arrangements and modifications which may replace the embodiments and the constructions may exist at the time of filing of this application.

FIG. 1 is a block diagram schematically illustrating a configuration of a terminal 100 according to an embodiment of the present invention.

Referring to FIG. 1, the terminal 100 may include a wireless communication unit 110, an input unit 120, an audio processing unit 130, a display unit 140 and a storage unit 150. In FIG. 1, a portable terminal such as a smart phone including the wireless communication unit 110 is used as an example of the terminal 100, but the present invention is not limited thereto.

The terminal 100 configured as described above may provide a security authentication method capable of detecting an illegal attempt to disable security under execution of an active security program 151 stored in the storage unit 150. Hereinafter, the roles and functions of components of the terminal 100 for providing active security authentication will be described in detail.

The wireless communication unit 110 may be a mobile communication module in consideration of mobility of the terminal 100. For example, the wireless communication unit 110 may be a 3G communication network support module or Wi-Fi support module. The wireless communication unit 110 may also be a communication module for Wibro, HSDPA, etc. In a case where the terminal 100 executes the active security program 151 in connection with a specific server, the wireless communication unit 110 may form a communication channel for signal communication with the corresponding server. In a case where the terminal 100 supports a function such as electronic payment, the wireless communication unit 110 may form a communication channel with a provider server that provides a web page for purchasing a product and a payment server for paying a specific product selected by a user. Meanwhile, in a case where the terminal 100 does not support a separate wireless communication function, the wireless communication unit 110 may be omitted.

Although it has been described in this embodiment that the terminal 100 is provided with the wireless communication unit 110, the present invention is not limited thereto. For example, the terminal 100 may be provided with a wire communication unit accessible to a wire communication network other than the wireless communication unit, and may be provided with a wireless communication unit together the wireless communication unit.

The input unit 120 may include a plurality of input keys and function keys for receiving input number or character information and setting various types of functions. The function keys may include directional keys, side keys and shortcut keys, which are set to perform specific functions. In a case where the display unit 140 of the terminal 100 supports a touch screen function, the plurality of input keys and function keys of the input unit 120 may be omitted, and the input unit may be replaced with the display unit 140. In a case where the terminal 100 is manufactured in the form of a full touch screen, the input unit 120 may include only side keys or specific function keys for controlling power on/off or operations of a camera. If a security authentication screen is output in the display unit 140 as the active security program 151 is activated, the input unit 120 may generate an input signal corresponding to a specific key selected under the control of a user and transmit the generated input signal to the control unit 160. Then, the control unit 160 may control security authentication to be performed by identifying whether or not a specific password according to the input signal input from the input unit 120 corresponds to previously set security information 153.

The audio processing unit 130 may output, to a speaker SPK, an audio signal received through the wireless communication unit 110 or an audio signal generated by reproducing an audio file stored in the storage unit 150, or may transmit an audio signal such as voice input from a microphone MIC through the wireless communication unit 110 under the control of the control unit 160. Particularly, in a case where a password input by the user corresponds to the previously set security information 153 in the state in which the security authentication screen is output, the audio processing unit 130 of the present invention may output an effect sound according to the generation of the specific input signal by the user, etc. In a case where the password input as many as a certain number of times does not correspond to the previously set security information 153, the audio processing unit 130 may output a warning sound or may output various announcement sounds related to loss or theft of the terminal 100, based on the user setting policy.

The display unit 140 provides various screens of the terminal 100, such as a menu screen, a standby screen and a telephone call screen. In a case where the user performs electronic commerce based on the terminal 100, the display unit 140 may output a screen for product purchase site, a product purchase screen, a screen for payment approval request, a payment approval screen, a user authentication screen, etc. The display unit 140 may support a touch screen function by disposing a touch panel 143 on the top of a display panel 141 on which the screens described above are output. In this case, the display unit 140 may support the function of an input means capable of generating a specific input signal based on the touch panel 143. Meanwhile, the display unit 140 may be formed as a flat panel display device formed based on thin film transistors, such as a liquid crystal display (LCD) or organic light emitting diode (OLED). Particularly, the display unit 140 of the present invention may output a security authentication screen under the execution of the active security program 151. In a case where the terminal 100 does not operate for a certain period of time according to the user's setting, the security authentication screen is transferred to a security screen, and may then be output in the display unit 140 when an input signal for reusing the terminal is generated. In a case where the display unit 140 has a touch screen function, the security authentication screen output in the display unit 140 may be a key map screen having a matrix structure in which numbers, characters, special characters, images or icons are arranged in a certain matrix. In a case where the terminal 100 does not support the touch screen function, the security authentication screen may be an input window including information that requests the user to input a password. In a case where the user presses a key button, etc., the input window may output a specific symbol corresponding to the key button pressed by the user. The security authentication screen in the form of the key map screen will be described in detail with reference to the following exemplary screen.

The storage unit 150 may store not only a program necessary for functional operations of the terminal 100 but also data input from the input unit 120, data transmitted from another terminal, information received through the wireless communication unit 110, etc. The storage unit 150 generally includes a program region and a data region.

The program region may store an application program necessary for device driving, such as an operating system (OS) for controlling a general operation of the terminal 100. For example, the program region may include a web application program for connection of the terminal 100 to a server and various programs for supporting electronic payment based on the web application program. Particularly, the program region stores the active security program 151 for providing an active security authentication function of the present invention.

The active security program 151 is a program including various routines for providing the active security authentication function of the present invention. The active security program 151 may include a random-number matrix generating routine, a security information identifying routine and a security processing routine. The random-number matrix generating routine is a routine that generates random numbers so that when a security authentication screen on which the user can input a password is output, the arrangement of various numbers, characters or symbols included in a key map of the output security authentication screen can be changed randomly or dynamically according to a predetermined rule. The control unit 160 may configure a security authentication screen by arranging keys according to the random numbers generated by the random-number generating routine, and control the terminal 100 to output the corresponding screen in the display unit 140. The security information identifying routine is a routine that identifies whether or not a password corresponding to the input signal input from the input unit 120 or the display unit 140 having the touch screen function corresponds to the security information 153 stored in the data region in the state in which the security authentication screen is output. The security processing routine may include a routine for setting the number of times in which the input password does not correspond to the security information 153, a routine for deciding the password as an illegal one when the non-correspondence occurs and supporting illegal use prevention and password tracking.

The data region is a region that stores data generated by using the terminal 100, and may store phone books, audio data, corresponding contents, information corresponding to learner data, etc. Particularly, the data region may store the security information 153 for user authentication identification. The security information 153 is a password key for the use of the terminal 100, and may have a certain length or more. The data region may be information except repetitive numbers, characters, symbols or images. The security information 153 may include item information set to detect an illegal attempt to disable security, land mine disable information set to disable a "land mine," security setting information set by a user, and security disable information to be practically applied according to the application of the land mine.

The control unit 160 may control a general operation of the terminal 100 and signal flow between internal blocks, and may control data processing functions, etc. Particularly, the control unit 160 according to the present invention supports to activate the active security program 151 based on an operating state of the terminal 100 and to provide the active security authentication function under the execution of the active security program 151. To this end, the control unit 160 may include components as shown in FIG. 2.

The terminal 100 is a device capable of setting or disabling security through an input of security information, and may include mobile communication terminals, portable multimedia players (PMPs), digital broadcasting players, personal digital assistants (PDAs), music players (e.g., MP3 players), portable game terminals, smart phones, notebook computers, handheld personal computers (PCs), automated teller machines (ATMs), digital door locks, etc.

Figure 2:
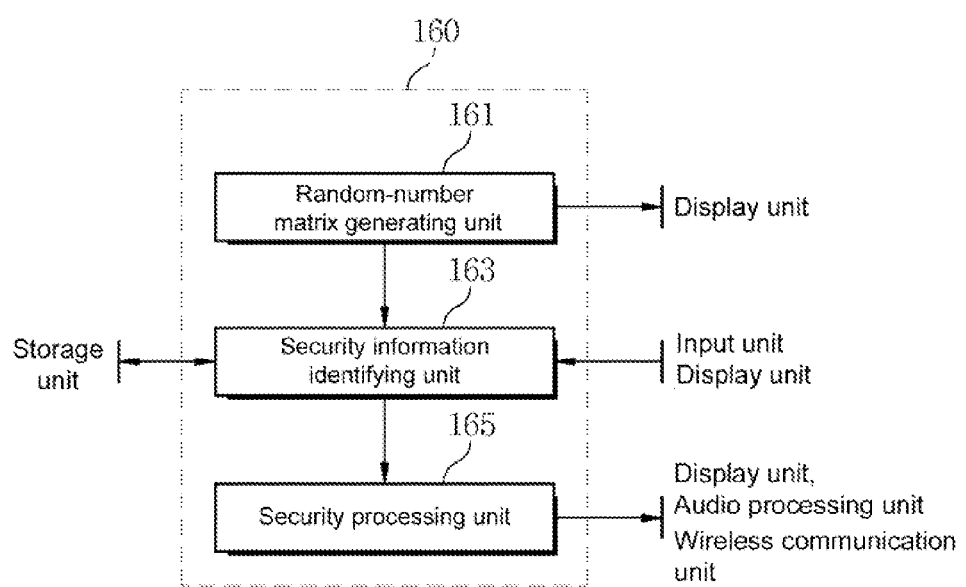
FIG. 2 is a diagram illustrating in detail a configuration of a control unit in the terminal according to the embodiment of the present invention.

FIG. 2 is a diagram illustrating in detail a configuration of the control unit 160 according to the embodiment of the present invention.

Referring to FIG. 2, the control unit 160 according to the embodiment of the present invention may include a random-number generating unit 161, a security information identifying unit 163 and a security processing unit 165.

The random-number generating unit 161 is a component that generates a random-number matrix so as to output a security authentication screen. The random-number generating unit 161 may generate a random-number matrix for a number-based active security authentication screen and a random-number matrix for a picture-based active security authentication screen according to credential media.

The security information identifying unit 163 is a component that identifies whether or not input information input from the display unit 140 having the touch screen function corresponds to security setting information previously set by a user in the state in which the security authentication screen is output. The security information identifying unit 163 may output security disable information of the currently output security authentication screen by applying previously input land mine information to the security setting information. More specifically, even a number or picture selected to be included in the security setting information on a matrix in which various numbers, pictures, etc. are randomly arranged by the random-number matrix may be redefined as illegal security disable attempt information by the placement of a specific number or picture set to a land mine. The security information identifying unit 163 generates security disable information on the numbers, pictures, etc. set as the security setting information based on the location at which the number or picture previously set to the land mine is placed on the current security authentication screen. The security information identifying unit 163 may identify whether or not the input information input by the user corresponds to the generated security disable information. Here, the security information identifying unit 163 may also identify whether or not information set to the illegal security disable attempt is input by the user's setting and the location of the land mine. The security authentication screen, the security setting information and the security disable information according to the application of a land mine will be described in detail with reference to the following exemplary screen.

The security processing unit 165 may disable security setting based on an information identifying result transmitted from the security information identifying unit 163, or may perform a process for preventing an illegal use of the terminal 100. For example, in a case where the input information includes the illegal security disable attempt information according to the location of the land mine on the security authentication screen, the security processing unit 165 may decide that an illegal user has made an illegal attempt to disable security. In this case, the security processing unit 165 may perform different processes for preventing the illegal use of the terminal 100 according to the input of information set to the land mine and the input of information set to a dangerous direction depending on the placement of the land mine. That is, in a case where the information set to the land mine is included in the input information, the security processing unit 165 may perform not only a security function of closing all user functions of the terminal 100 but also a security function of photographing a moving image by activating a camera function and transmitting the photographed moving image to a predetermined server. The security processing unit 165 may perform a security process of deleting information, based on the user setting policy, by forcibly deleting all data stored in the storage unit 150 of the terminal 100 or by forcibly deleting user information related to finance. The security processing unit 165 may inform the user of an illegal use or password authentication input error, based on the user setting policy.

Meanwhile, in a case where the information set to a dangerous direction depending on the placement of the land mine is input as the input information, the security processing unit 165 may first notify the user of an authentication error based on the user setting policy and then provide an additional input chance. In a case where the authentication error occurs the additional input chance is provided as many as a certain number of times, the security processing unit 165 may control the terminal 100 to perform at least one of the security processes described above. The security processing unit 165 may determine whether or not to apply the security process by identifying the current location information of the terminal 100 when dangerous direction pattern information input according to the input of land mine information or the placement of the land mine and identifying whether or not the current location information is the same location information when a previous user performed security authentication. To this end, the security processing unit 165 may accumulate and store the current location information by activating GPS, etc. when the user performs the security authentication, determine the location information accumulated as many as a certain number of time or more as a user's living region, and use the accumulated location information as a reference for determining whether or not to apply the security process. Meanwhile, in a case where it is decided that the illegal user has made an illegal attempt to disable security, the security processing unit 165 may control the terminal 100 to block a user's logging attempt, to inform the number of another terminal, previously stored by the user, of the information on the decision of the illegal use, and to output a predetermined alarm, etc.

As described above, the terminal 100 according to the embodiment of the present invention operates a security authentication screen to which an item capable of detecting an illegal attempt to disable security is applied, so as to support a security function of detecting illegal users without providing only a password input function for simply disabling security. Further, in a case where the user starting security disability is decided as an illegal user, the terminal 100 according to the embodiment of the present invention performs various illegal use processes based on the decision, so as to support a security function of actively taking an appropriate action so that the illegal use of the terminal 100 is not performed.

The components and functions of the terminal 100 according to the embodiment of the present invention have been described. Hereinafter, a method for providing active security authentication according to an embodiment of the present invention will be described in detail with reference to FIG. 3.

Figure 3:
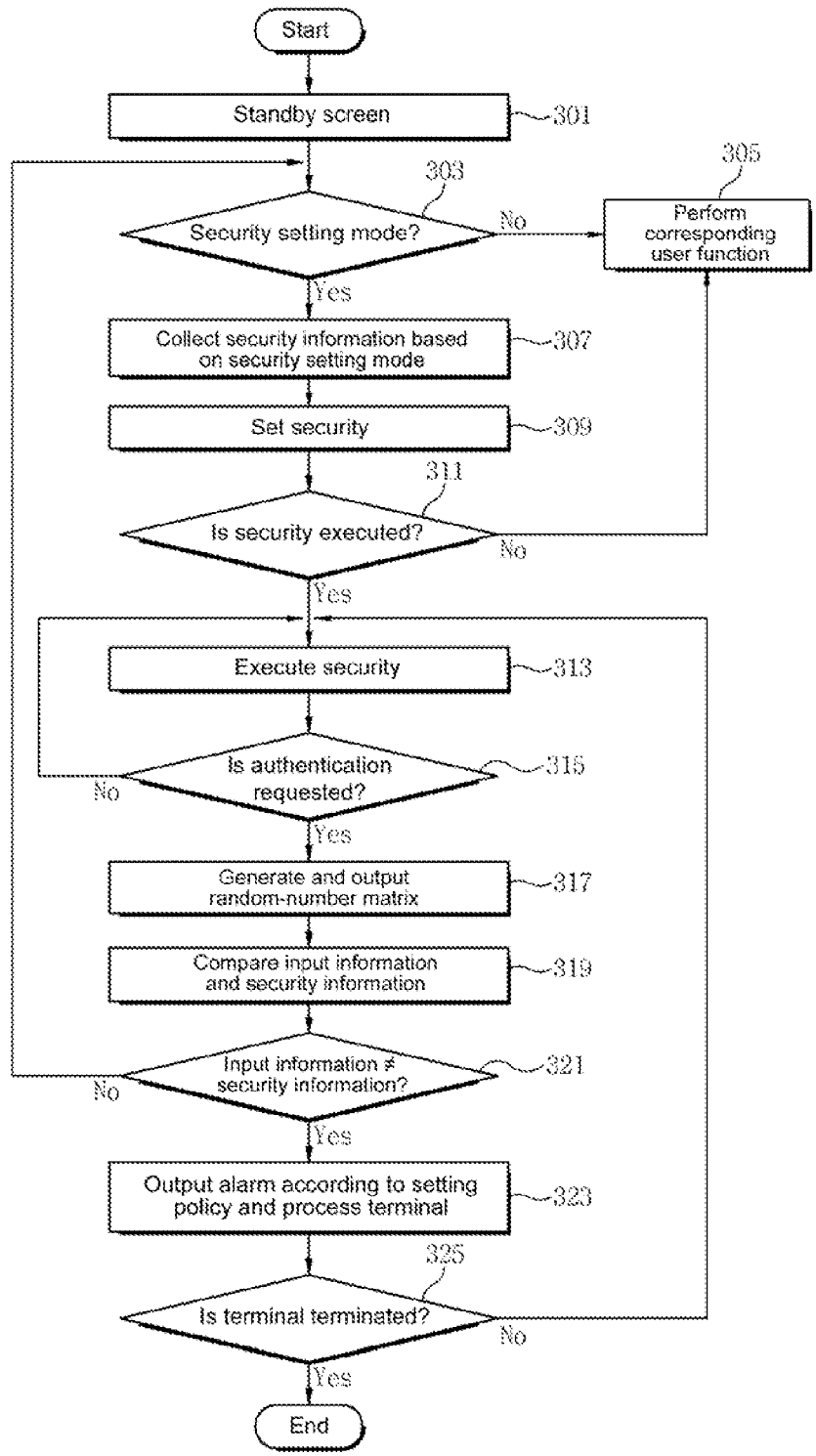
FIG. 3 is a flowchart illustrating a method for providing security authentication according to an embodiment of the present invention.

FIG. 3 is a flowchart illustrating a method for providing security authentication according to an embodiment of the present invention.

Referring to FIG. 3, in the method according to the embodiment of the present invention, when power is supplied to the terminal 100, the control unit 160 of the terminal 100 may control each component of the terminal to be initialized based on the supplied power. Accordingly, the terminal 100 performs a booting process. If the booting process is finished, in step 301, the terminal 100 may control the control unit 160 to output a standby screen in the display unit 140 according to predetermined schedule information.

Next, in step 303, the terminal 100 may identify whether or not an input signal for a security setting mode is generated. In a case where the generated input signal is not an input signal for the security setting mode, the terminal 100 proceeds to step 305 and may selectively perform a corresponding user function of the terminal, e.g., a phone call function, a file search function, a file reproduction function, a file generation function, a camera function, a broadcast reception function, etc., according to the generated input signal.

If an input signal for activating the security setting mode is generated from the input unit 120 or the display unit 140 having the touch screen function in step 303, the terminal 100 proceeds to step 307 and may perform security information collection based on the security setting mode. More specifically, the terminal 100 controls a key map for inputting the security information 153 to be set to a password to be output in the display unit 140 so as to disable security, and may collect the security information 153 according to a user input signal. In this case, the terminal 100 may collect security setting information corresponding to the password and land mine information for detecting an illegal attempt to disable security. The terminal 100 may also collect dangerous direction pattern information according to the placement of a land mine together with the security setting information and the land mine information. Here, the dangerous direction pattern information is information including a pattern about which one of regions adjacent the land mine is to be set to the dangerous direction pattern information according to the placement of the land mine. For example, the dangerous direction pattern information may include a 4way operation pattern in which all numbers or figures existing in the cross (†) direction about the land mine may be turned into land mines, and an 8way operation pattern in which all numbers or figures surrounding the land mine may be turned into land mines. Meanwhile, the terminal 100 may support to output a matrix screen including no more than a certain number of at least one of a number, a character, a symbol and a figure when the matrix screen for collecting the security information 153 is output. The terminal 100 may support to store the collected security information 153 in the storage unit 150. In this case, the stored security information 153 may pass through encryption using a predetermined method.

Next, if the security information 153 is collected, in step 309, the terminal 100 performs security setting based on the corresponding security information 153. That is, in a case where a separate input signal is not generated for a certain period of time or a specific user function is intended to perform, the terminal 100 sets a security execution function for identifying authentication by outputting a security authentication screen based on the currently collected security information 153.

Next, in step 311, the terminal 100 may identify whether or not the security is executed. That is, the terminal 100 may identify whether or not the operating condition of the terminal 100 corresponds to that for executing the security. For example, the control unit 160 of the terminal 100 may identify whether or not to the security is executed according to various cases such as a case where an input signal is not generated, for a certain period of time, from the input unit 120 or the display unit 140 having the touch screen function without performing a separate user function, a case where a user function set so that the security is executed in advance is selected, a case where the transfer between turn-on and turn-off of the terminal 100 occurs and a case where the insertion of an SIM card occurs. In a case where a separate condition for executing the security does not occur, the control unit 160 proceeds to step 305, and may support the terminal 100 to perform the specific user function according to the input signal or control the terminal 100 to maintain the currently activated user function.

In a case where the operation state of the terminal 100 satisfies the condition for executing the security in step 311, the control unit 160 of the terminal 100 proceeds to step 313, and controls the terminal 100 to execute the security. As the security is executed, the control unit 160 of the terminal 100 may identify whether or not an input signal for authentication request is generated in step 315. In the generating of the input signal for authentication request, an event for outputting the security authentication screen in the display unit 140 occurs. In a case where the terminal 100 is not used for a certain period of time, an input signal for "waking up" the terminal 100 in a lock setting mode is generated.

Meanwhile, one of steps 313 and 315 may be omitted according to the user function. That is, in a case where an input signal for performing a specific user function is generated so that the security is executed, the control unit may determine the corresponding operation as the generation of the input signal for executing the security in step 311, and control the terminal 100 to proceeds to step 317.

Next, in step 317, the control unit 160 may control the terminal 100 to configure a security authentication screen by generating a random-number screen and to output the generated security authentication screen in the display unit 140. Here, the security authentication screen may be a matrix screen on which a plurality of at least one of a number, a character, a symbol and a picture are arranged through a certain arrangement of random numbers.

In step 319, the control unit 160 compares the input information input in the state that the security authentication screen is output with the security information 153 previously set by the user and stored in the storage unit 150. In this process, the user may attempt to disable security by generating input information corresponding to security disable information except the location of the land mine, previously set on the security authentication screen, and the dangerous direction pattern information determined according to the location of the land mine.

In step 321, the control unit 160 may identify whether or not the input information and the security information 153 correspond to each other. In a case where the input information and the security information 153 correspond to each other, the control unit 160 decides the user as a normal terminal user and proceeds to step 303. Then, the controller 160 may control the terminal 100 to perform the following process, e.g., a function of returning to a user function that performed before the security performance, performing the security setting mode according to the input signal, performing the corresponding user function, etc. In this process, the control unit 160 may first check whether or not land mine information and dangerous direction pattern input are included in the input information, and decide the use of the terminal 100 as an illegal use when the land mine information and dangerous direction pattern input are included in the input information. Here, the land mine information defines an exception key which the user must not press in spite of a key map placed by the random-number matrix and a password, and the dangerous direction pattern information defines an exception key which the user must not press according to the land mine information.

In a case where the land mine information and the dangerous direction pattern information are not included in the input information, the control unit 160 outputs the security disable information except the land mine information and the dangerous direction pattern information, which are defined as information on an illegal attempt to disable security, from the previously stored security setting information. The control unit 160 may compare the input information with the security disable information and identify whether or not the input information and the security disable information correspond to each other.

Meanwhile, the control unit 160 may identify whether or not the input information is input information for previously disabling the land mine information. That is, to previously disable the land mine information, the controller 160 may previously define land mine disable information or collect the land mine disable information from the user, and identify whether or not the current input information corresponds to the land mine disable information, based on the land mine disable information. Here, the land mine disable information may also be configured to include of a plurality of at least one of a number, a character, a symbol and a picture. The land mine disable information may include a specific key combination regardless of the land mine information or the dangerous direction pattern information. In a case where the current input information is land mine disable information, the control unit 160 may determine the use of the terminal 100 as an illegal use by removing the land mine from the current security authentication screen, comparing subsequent input information with the security setting information and then identifying whether or not the subsequent input information and the security setting information correspond to each other.

In a case where the input information and the security information 153 do not correspond to each other, or information set to the dangerous direction pattern information according to the placement of the land mine is input in step 321, the control unit 160 proceeds to step 323 and may perform a security process of outputting an alarm according to the user setting policy, etc. That is, the control unit 160 may control the terminal 100 to output a message for warning the user of the input inaccurate information, to prohibit the user from using the terminal 100 or to delete all user information stored in the SIM card. Here, the user information may include various kinds of information such as user's financial information, user's password, user's web access information and user's ID and password information for web access. In step 323, the control unit 160 may decide the current input information as an illegal attempt to disable security and control the terminal 100 to perform at least one of the security processes for the illegal use described above, i.e., a security process of providing a chance to re-input new input information as many as a predetermined number of times, a security process of informing the security server, a security process of deleting information and informing an illegal use, a security process of restricting the access to a specific server and a security process of location tracking. In this case, the control unit 160 may support the terminal 100 to perform at least one of the security processes or to simultaneously perform a plurality of security processes among the security processes according to the type of the input information. That is, the control unit 160 may support the terminal 100 to perform the security process according to whether or not an item key set to detect an illegal attempt to disable security is included in the input information, whether or adjacent dangerous direction pattern information is included in the input information according to the placement of the item key, whether or not the input information correspond to the security setting information or the security disable information, etc.

In step 321, the control unit 160 may control the terminal 100 to provide a chance to re-input a password as many as a certain number of times when the input information and the security information 153 do not correspond to each other. In a case where accurate information is not input during the corresponding number of times, the control unit 160 proceeds to step 323 and may control the terminal 100 to perform the function described above.

Then, in step 325, the control unit 160 identifies whether or not an input signal for terminating the terminal 100 is generated. In a case where a separate input signal for terminating the terminal 100 is not generated, the control unit 160 proceeds to step 313 and may control the terminal 100 to maintain the security execution state. Meanwhile, in step 323, the control unit 160 may control the terminal 100 to be forcibly terminated according to the generation of inaccurate information.

Although it has been described above that the security authentication is performed based on only the terminal 100, the present invention is not limited thereto. That is, the function of providing active security authentication may provide various operating forms based on a server. This will be described in detail with reference to FIG. 4.

Figure 4:
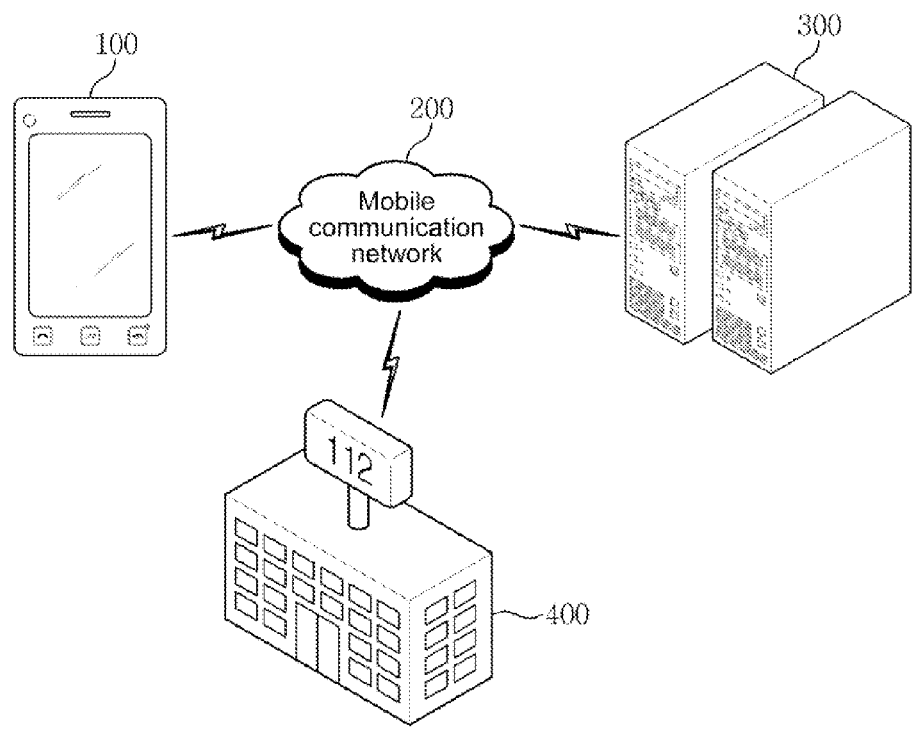
FIG. 4 is a diagram schematically illustrating a configuration of a system for providing security authentication according to an embodiment of the present invention.

FIG. 4 is a diagram schematically illustrating a configuration of a system 10 for providing security authentication according to an embodiment of the present invention.

Referring to FIG. 4, the system 10 according to the embodiment of the present invention includes a terminal, a mobile communication network 200, a content server 300 and a security management server 400.

The system 10 configured as described above may attempt to access the content server 300, based on the mobile communication network 200 under the control of a user. Then, the content server 300 may identify whether or not the user correct security disable information by providing the terminal 100 with the security authentication screen described in FIGS. 1 to 3. In this process, the content server 300 may receive security information including security setting information and land mine information, previously input in the user's information registration process of the terminal 100, encrypt the input security information using an encryption tool and then store the encrypted input security information. In a case where the terminal 100 attempts to access the content server 300, the content server 300 may provide the terminal 100 with the security authentication screen on which a key map is placed by a combination of random numbers according to the random-number generating method described above. Here, the key map may be a map in which a plurality of at least one of a number, a character, a symbol and an image are arranged.

The content server 300 may compare security disable information generated based on the previously stored security setting information and land mine information with input information transmitted from the terminal 100. Here, the content server 300 may compute practically valid security disable information, based on the placement of the key map of the security authentication screen, generated by a random-number matrix, and the land mine information, and compare whether or not the computed security disable information and the input information correspond to each other.

In a case where the input information does not correspond to the security disable information, or land mine information or information redefined as dangerous direction pattern information according to the placement of the land mine is included in the input information in the comparing process, the content server 300 may perform a security process of informing a security server, a security process of deleting information, a security process of informing an illegal use, a security process of restricting logging, etc.

The security process of informing a security server is a security process of informing the security management server 400 that the corresponding terminal 100 is illegally used. Then, the security management server 400 may perform a security process of tracking the location of the terminal 100, tracking the IP of the terminal 100, receiving an image or moving picture under the operation of a camera, etc. according to the corresponding information.

The security process of deleting information is a security process of informing the security management server 400 that the current user of the terminal 100 is an illegal user and supporting the terminal 100 to delete at least a portion of various kinds of information stored in the storage unit 150 using a self-security tool of the terminal 100. The security process may be operated by the security management server 400.

The security process of informing an illegal use is a security process of informing the security management server 400 that the current user is an illegal user of the terminal 100 and supporting the terminal 100 to output a predetermined alarm, e.g., an alarm or siren for warning the illegal use. The security process may also be operated by the security management server 400. To this end, the content server 300 may transmit the information on the illegal use of the terminal to the security management server 400.

The security process of restricting logging is a security process in which the content server 300 decides that the terminal 100 is operated by an illegal user and restricts the access to a corresponding server during a certain period of time. Alternatively, the security process of restricting logging is a security process of requesting the user to additionally input previously registered information for the purpose of logging and disabling the restriction of logging by identifying the additionally input information.

The content server 300 may be at least one of servers providing various contents, such as a provider server for purchasing products, a payment server for paying products, a game server, etc.

If the content server 300 informs the security management server 400 that a specific terminal 100 performs an operation corresponding to the illegal use, the security management server 400 may control the content server 300 to restrict the use of the terminal 100 or to track the location of the terminal 100.

Meanwhile, the content server 300 may apply the user setting policy according to key values included in the input information as described above. That is, if an inaccurate password is input without including land mine information or dangerous direction pattern information according to the placement of the land mine, the content server 300 may additionally provide the corresponding terminal 100 with a chance to input a password as many as a certain number of times. In a case where an accurate password is not input even in the additional input chance, the content server 300 may perform the security process described above.

If the content server 300 receives input information from the terminal 100, the content server 300 may identify whether or not the received input information corresponds to land mine disable information. In a case where the input information corresponds to the land mine disable information, the content server 300 may control the terminal 100 to disable the land mine on the security authentication screen. The content server 300 may transmit, to the terminal 100, a message or alarm for guiding the input of security setting information, and may control the terminal 100 to perform security authentication by comparing the additional input information with the security setting information.

As described above, the system 10 according to the embodiment of the present invention can support the content server 300 to perform the security authentication, based on the security authentication screen including the land mine for detecting an illegal attempt to disable security in the access attempt of the terminal 100. Accordingly, the system 10 according to the embodiment of the present invention can perform more reliable security authentication and more actively perform prevention of an illegal use.

Although it has been described above that the security management server 400 perform a function related to security by dividing the security management server 400 and the content server 300 into separate components, the present invention is not limited thereto. That is, the content server 300 may directly perform a function of tracking the location of the terminal, deleting information of the terminal, restricting the use of the terminal, etc. according to the agreement with the user.

Hereinafter, a security authentication screen and the input of security disable information to which a land mine is applied according to an embodiment of the present invention will be described in detail with reference to an exemplary screen.

Figure 5:
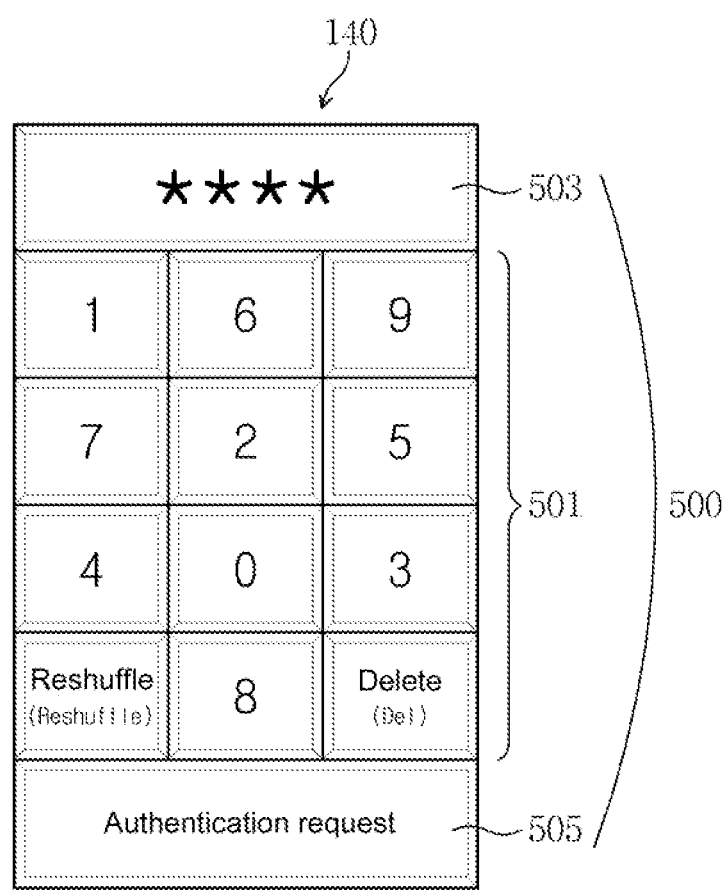
FIG. 5 is an exemplary diagram illustrating a screen for providing security authentication according to an embodiment of the present invention.

FIG. 5 is an exemplary diagram illustrating a screen for providing security authentication according to an embodiment of the present invention.

Referring to FIG. 5, the security authentication screen 500 according to the embodiment of the present invention, output in the display unit 140, may include a key map region 501 according to a random-number matrix generated by the random-number generating unit 161 of the control unit 160, an input information output region 503 for outputting a specific symbol corresponding to user input information, and an authentication request region 505 for requesting security authentication as input information.

The key map region 501 is a region in which keys randomly arranged by the random-number matrix are arranged in a matrix form. The key map region 501 shown in FIG. 5 is a region in which number keys are arranged. The key map region 501 may include a "reshuffle" key region for requesting a new arrangement of keys reshuffled by the random-number matrix and a "delete" key region for removing previously input keys. A user may input keys corresponding to security setting information previously set using a plurality of number keys, a reshuffle key and a delete key, which are output in the key map region 501.

The input information output region 503 is a region in which as the user selects number keys provided in the key map region 501, specific symbols corresponding to the selected keys are output. The input information output region 503 may output numbers corresponding to the number keys selected in the key map region 501. However, to prevent the exposure of a password by another person, the output numbers may be replaced with numbers input using a star-shaped symbol as shown in FIG. 5. The user selects at least one of the number keys and inputs a certain arrangement of numbers. In a case where a number undesired by the user is input by accident, the user may delete the number using the "delete" key. In a case where the user desires another arrangement of number keys, the user may request the terminal of the arrangement of number keys reshuffled by another random-number matrix using the "reshuffle" key.

The authentication request region 505 is a region in which security authentication is requested based on the number keys selected in the key map region 501. That is, the authentication request region 505 is a region that generates an input signal for requesting the terminal to compare a password corresponding to security setting information, selected by a user in the key map region 501, with the previously set security setting information.

Meanwhile, the user may perform storage of security setting information, storage of land mine information and selection of input information corresponding to security disable information, based on the security authentication screen shown in FIG. 5. Hereinafter, the land mine information will be described in detail with reference to FIG. 6.

Figure 6:
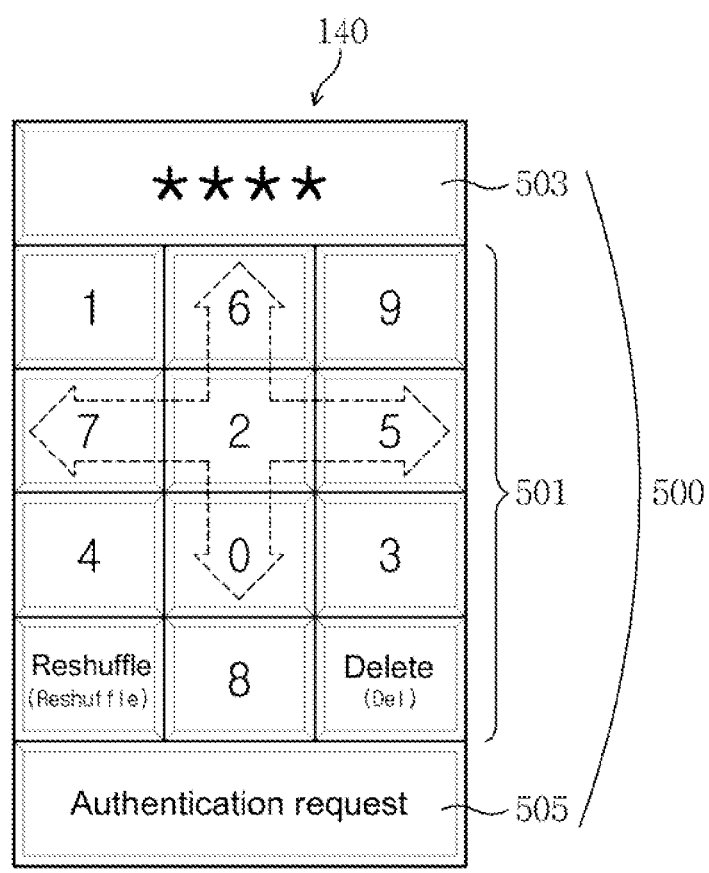
FIG. 6 is an exemplary diagram illustrating application of item keys in the screen for providing security authentication according to the embodiment of the present invention.

FIG. 6 is an exemplary diagram illustrating the setting of a land mine according to the embodiment of the present invention.

The user of the terminal 100 may set an item for detecting an illegal attempt to disable security in the state in which a security authentication screen is output. To this end, the terminal 100 may support the user to set, as the item, at least one of specific keys output on the security authentication screen. When security information is set, the user may set security setting information, e.g., "886341" based on the security authentication screen shown in FIG. 5. The user may set number "2" as the item. The user may select an application method of the item for detecting the illegal attempt to disable security, e.g., a "4way" method.

Subsequently, if a request for security authentication occurs in a security execution state, the terminal 100 may output the security authentication screen 500 in the display unit 140 as shown in FIG. 5. In this case, the terminal 100 may output current security disable information generated by a random-number matrix while outputting the security authentication screen 500. That is, the terminal 100 outputs security disable information applied to the currently output security authentication screen 500 with reference to key information "2" corresponding to the item for detecting the illegal attempt to disable security, which is selected by the user, and the "4way" method selected as the item application method. Here, the "4way" method is a method in which keys placed at the front, rear, left and right of the item in regions adjacent to the region in which a key defined as the item is output are set to dangerous direction pattern information so that the user does not input the keys. In a case where the corresponding dangerous direction pattern information is included in the input information for security authentication, the terminal 100 may decide the input attempt as an illegal attempt. For example, in a case where the key "2" defined as the item is placed at the center of the key map region 501 as shown in FIG. 6, numbers 6, 5, 0 and 7 may be set to the dangerous direction pattern information. Then, in a case where the previously stored security setting information is "886341," "88341" except the number "6" may become actual security disable information. Accordingly, the user may input "88341" in the key map region 501 in the state in which the security authentication screen 500 is output, and request the terminal 100 to identify the security authentication by pressing the authentication request region 505.

Although it has been described above that in the "4way" method, the keys placed at the front, rear, left and right of the item are set to the dangerous direction pattern information to be removed from the password, the present invention is not limited thereto. That is, the "4way" method may be a method in which keys placed in a diagonal direction are set to the dangerous direction pattern information. The item may be placed not only at the center of the key map region 501 but also in various regions such as a corner region and an edge region according to the random-number matrix. In a case where number "9" is selected as the item and the keys are placed at the front, rear, left and right of the item in the "4way" method, the keys not to be pressed in the security authentication screen shown in FIG. 6 may become "6, 9 and 5".

Figure 7:
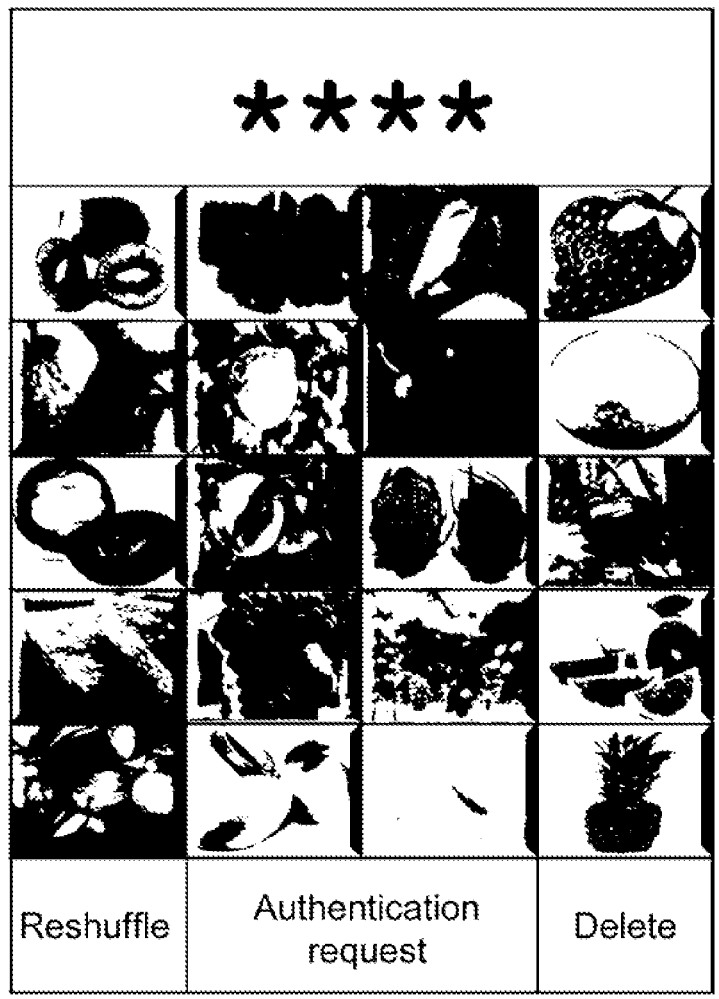
FIG. 7 is an exemplary diagram illustrating a screen for providing security authentication according to another embodiment of the present invention.
Figure 8:
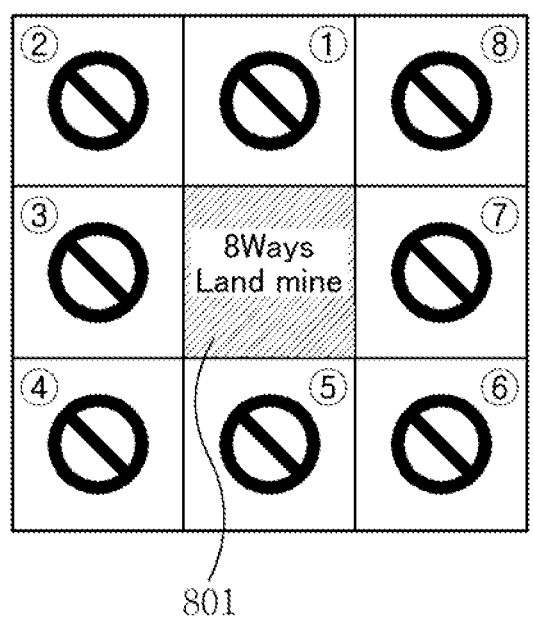
FIG. 8 is an exemplary diagram illustrating application of item keys to risk directional pattern information according to the embodiment of the present invention.

Although it has been described above that the random-number matrix is based on ten number keys, the present invention is not limited thereto. That is, the security authentication screen 500 may be configured in a structure in which images, e.g., fruit images are arranged in a predetermined 4×5 matrix form as shown in FIG. 7. Here, a specific fruit image may be selected as the item as described in FIGS. 5 and 6, and the dangerous direction pattern information may be determined according to the application method of the item set based on the selected fruit image. Particularly, as shown in FIG. 8, the item application method may be performed using an "8way" method on the security authentication screen 500. The "8way" method is a method in which keys placed at the front, rear, left, right and four corners with respect to a key defined as an item 801 for detecting an illegal attempt to disable security are set to dangerous direction pattern information so that the user does not input the keys as shown in FIG. 8.

Meanwhile, the terminal 100 identifies input information for disabling a land mine defined as the item. In a case where the corresponding input information is input, the terminal 100 may disable the land mine. For example, in a case where the user touches down the authentication request region 505 for a certain period of time, based on the security authentication screen 500 shown in FIG. 5, the terminal 100 may control the set land mine to be disabled. Then, the user may obtain security authentication by sequentially inputting "886341" that is previously set security setting information. Alternatively, in a case where the security setting information is "886341" and the number for disabling the land mine is number "9," the user may obtain security authentication by sequentially inputting numbers "8" and "8," inputting number "9" other than number "6" and then sequentially inputting numbers "3" and "4."

As described above, the method according to the embodiment of the present invention supports the terminal to apply an item for detecting an illegal attempt to disable security on a security authentication screen on which keys are arranged based on a random-number matrix, so that it is possible to perform more active prevention of an illegal use. In this case, the method supports the terminal to apply new security disable information every time according to the arrangement of keys on the security authentication screen, which is renewed whenever an attempt to disable security is made or renewed by a user's request, and the location of an item for detecting an illegal attempt to disable security. Accordingly, the security authentication process can be more reliably performed.

Meanwhile, the terminal 100 may further include components which are not described above, such as a short-range communication module for short-range communication, an interface for data communication using a wire/wireless communication scheme, an Internet communication module for performing an Internet function through communication with an Internet network and a digital broadcasting module for receiving digital broadcasting and performing a reproducing function. Although it is difficult to list all of these components that are variously configured according to the convergence of digital devices, components equivalent to those described above may be further included in the device described above. It will be apparent that in the terminal 100 of the present invention, specific components may be excluded from the components described above or may be replaced with other components. This can be easily understood by those skilled in the art.

Although the present invention has been described in connection with the preferred embodiments, the embodiments of the present invention are only for illustrative purposes and should not be construed as limiting the scope of the present invention. It will be understood by those skilled in the art that various changes and modifications can be made thereto within the technical spirit and scope defined by the appended claims.

The invention claimed is:

1. A system for providing active security authentication, the system comprising:
   a terminal configured to output a security authentication screen and to receive input information based on a security authentication screen in which a plurality of keys are arranged and at least one of numbers, characters, symbols, and figures are randomly displayed corresponding to respective ones of the plurality of keys; and
   a content server configured to
      receive and register, from the terminal, at least one land mine information based on at least one of the numbers, characters, symbols, and figures and security setting information for security authentication, the land mine information corresponding to a first exception key, and the content server is further configured
      to provide the terminal with a security authentication screen based on the security authentication screen in which dangerous direction pattern information is set according to a placement of the first exception key, wherein a plurality of second exception keys corresponding to the dangerous direction pattern information are arranged adjacent to the first exception key to detect an illegal attempt during an authentication, and
      to determine whether the terminal is illegally used according to a determination whether at least one of the first and the second exception keys are detected as input information in the security authentication screen.

2. The system according to claim 1, wherein, the first and the second exception keys are received and registered in the security setting information, the content server performs security authentication according to whether the second exception keys are included in the security setting information.

3. The system according to claim 2, wherein, when the exception key is not registered in the security setting information, the content server is configured to determine whether the terminal is used for the illegal use according to whether or not the input information is matched with the security disable information.

4. The system according to claim 3, wherein the content server is configured to perform a security process according to whether one of the plurality of keys is detected in the input information, whether the first exception key or the second exception keys is detected in the input information, or whether the input information is matched with the security disable information.

5. The system according to claim 3, wherein the content server is further configured to perform a security process
   by providing a re-input new input information a predetermined number of times,
   by informing a specific security management server of the illegal use of the terminal,
   by deleting at least a portion of information stored in the terminal for performing security authentication,
   by providing the terminal with a message or alarm for the illegal use,
   by restricting an access of the terminal to a server, or
   by tracking the location of the terminal based on location information or IP information of the terminal.

6. The system according to claim 1, wherein the content server is configured to determine whether or not the input information is an input signal for removing the plurality of keys, to control the plurality of keys not to be applied to the security authentication screen when the input information is the input signal for removing the plurality of keys, and to determine whether the terminal is used for the illegal use according to whether or not subsequent additional input information corresponds to the security setting information.

7. A terminal for supporting active security authentication, comprising:
   a storage unit configured to store a first exception key for detecting an illegal attempt to disable security among a plurality of keys, the first exception key corresponding to land mine information and representing one of the numbers, characters, symbols, and figures in which a plurality of second exception keys are arranged adjacent to the first exception key, the second exception keys correspond to the dangerous direction pattern information, wherein the first and the second exception keys are set to detect whether the terminal is illegally used if being pressed, and to store security setting information for security authentication;
   a display unit configured to display a security authentication screen based on a random-number matrix in which the plurality of keys are arranged, and at least one of numbers, characters, symbols, and figures are randomly displayed corresponding to respective ones of the plurality of keys;
   an input unit configured to receive input information including at least one of the plurality of keys for the security authentication; and
   a control unit configured to
      arrange the plurality of keys through an arrangement of random numbers,
         to output, to the display unit, the security authentication screen based on the random-number matrix in which the dangerous direction pattern information is set according to a placement of the first exception key, wherein a plurality of second exception keys are arranged adjacent to the first exception key to detect an illegal attempt during an authentication, the second exception keys correspond to the dangerous direction pattern information and
         to determine whether the terminal is illegally used according to whether the first and the second exception keys are detected in the security authentication screen.

8. The terminal according to claim 7, wherein, the first and the second exception keys are received and registered in the security setting information, the content server performs security authentication according to whether the second exception keys are included in the security setting information.

9. The terminal according to claim 8, wherein, in response to determination of the terminal being used for the illegal use, the control unit is configured to perform at least one of a security process by providing a re-input new input information a predetermined number of times according to at least one of when the first exception key or the second exception keys is included in the input information or when the input information does not correspond to the security disable information, wherein the control unit is further configured to perform at least one of to inform a specific security management server of the illegal use of the terminal, to delete at least a portion of information stored in the storage unit for performing security authentication, to provide the terminal with a message or alarm for the illegal use and to restrict an access of the terminal to a server.

10. The terminal according to claim 7, wherein the security authentication screen comprises a key map screen provided with a matrix structure in which at least one of the numbers, characters, special characters, images or icons are arranged in a certain matrix form.

11. The terminal according to claim 7, wherein the control unit is further configured to identify whether or not the input information is an input signal for removing one of the plurality of keys, to control the plurality of keys not to be applied to the security authentication screen when the input information is the input signal for removing the item key, to compare whether or not input information being additionally input subsequent to the item key being removed, to perform security authentication when the input information corresponds to the security setting information, and to determine that the terminal is used for the illegal use when the input information does not correspond to the security setting information.

12. A method for providing active security authentication, the method comprising:
   registering at least one item key for detecting an illegal attempt to disable security among the plurality of the keys and security setting information for security authentication, the at least one item comprises at least one of a first exception key and a plurality of second exception keys, the first exception key corresponding to land mine information and representing one of the numbers, characters, symbols, and figures, the second exception keys correspond to the dangerous direction pattern information, wherein the first and the second exception keys are set to detect whether the terminal is illegally used if being pressed;
   arranging the plurality of keys through an arrangement of random numbers;
   displaying a security authentication screen based on a random-number matrix in which at least some of the second exception keys are arranged adjacent to the first exception key both the first and the second exception keys being arranged by the arrangement of the random numbers;
   receiving input information including at least one of the plurality of keys;
   determining whether or not the first exception key and the second exception keys are detected in the input information, wherein
   a terminal is used for an illegal use in response to detection of at least one of the first exception key and the second exception keys being in the input information.

13. The method according to claim 12, further comprising registering a third exception keys and determining whether or not at least one of the third exception keys is included in the input information according to security setting information.

14. The method according to claim 13, further comprising:
   displaying security disable information, from the security setting information;
   identifying whether or not the input information corresponds to the security disable information; and
   determining whether the terminal being used for the illegal use when the input information corresponds to the security disable information.

15. The method according to claim 14, further comprising:
   performing a security process to detect whether the terminal having been used for the illegal use, wherein the performing of the security process comprises at least one of performing a security process according to whether at least one of the first exception key and the second exception keys are included in the input information and whether the input information does not correspond to the security disable information.

16. The method according to claim 12, further comprising:
   identifying whether or not the input information is an input signal for removing the plurality of the keys; and
   controlling the plurality of the keys not to be applied to the security authentication screen in response to detection of the input information being the input signal for removing the plurality of the keys.

17. The method according to claim 16, further comprising:
   comparing whether or not input information additionally input after the item key is removed corresponds to the security setting information,
   performing security authentication when the input information corresponds to the security setting information, and
   determining whether the terminal being used for the illegal use when the input information does not correspond to the security setting information.

18. The method according to claim 12, further comprising:
   performing a security process to detect whether the terminal having been used for the illegal use, wherein the performing of the security process comprises at least one of:
   providing a re-input new input information as a predetermined number of times;
   informing a security management server of the illegal use of the terminal;
   deleting at least a portion of information stored in the terminal for performing security authentication;
   outputting a message or alarm for the illegal use; and
   restricting an access of the terminal to a server.

* * * * *